US011724739B2

(12) United States Patent
Asadi et al.

(10) Patent No.: US 11,724,739 B2
(45) Date of Patent: Aug. 15, 2023

(54) VEHICLE ACTUATION COMMANDS TO AFFECT TRANSIENT HANDLING

(71) Applicant: GM Global Technology Operations LLC, Detroit, MI (US)

(72) Inventors: Ehsan Asadi, North York (CA); Seyedalireza Kasaiezadeh Mahabadi, Novi, MI (US); Gill Lipton, Farmington Hills, MI (US); Asal Nahidi, North York (CA); Isaac Tabatschnic, Richmond Hill (CA); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 17/382,879

(22) Filed: Jul. 22, 2021

(65) Prior Publication Data
US 2023/0044869 A1    Feb. 9, 2023

(51) Int. Cl.
*B62D 15/02*    (2006.01)
*B62D 7/14*    (2006.01)

(52) U.S. Cl.
CPC .......... *B62D 15/025* (2013.01); *B62D 7/142* (2013.01)

(58) Field of Classification Search
CPC .............................. B62D 15/025; B62D 7/159
See application file for complete search history.

(56) References Cited

U.S. PATENT DOCUMENTS

| 4,679,809 A * | 7/1987 | Ito .......................... | B62D 7/159 180/408 |
| 4,690,431 A * | 9/1987 | Ito .......................... | B62D 7/159 280/771 |
| 6,453,226 B1 * | 9/2002 | Hac ........................ | B62D 7/159 180/41 |

(Continued)

FOREIGN PATENT DOCUMENTS

| CN | 1522915 A * | 8/2004 | ............. B62D 7/159 |
| CN | 103978971 A * | 8/2014 | ............. B62D 6/002 |

(Continued)

OTHER PUBLICATIONS

"A Fault-Tolerant Integrated Vehicle Stability Control Using Adaptive Control Allocation;" Temiz et al.; ARXIV ID: 2008.05697; Aug. 13, 2020. (Year: 2020).*

(Continued)

*Primary Examiner* — Khoi H Tran
*Assistant Examiner* — Jorge O Peche
(74) *Attorney, Agent, or Firm* — Cantor Colburn LLP

(57) ABSTRACT

A method of controlling a vehicle includes obtaining a linear representation of a vehicle dynamics model that includes actuator dynamics u integrated with vehicle dynamics x. The actuator dynamics u include a road wheel angle at rear wheels $\delta r$ and a torque Mz. The method also includes obtaining an objective function based on a function of the vehicle dynamics x and the actuator dynamics u and formulating a cost function to minimize the objective function. The actuator dynamics u including the torque Mz are determined for a next time sample based on minimizing the objective function. The vehicle is controlled to implement the torque Mz.

18 Claims, 3 Drawing Sheets

(56) References Cited

U.S. PATENT DOCUMENTS

| | | | | |
|---|---|---|---|---|
| 8,271,175 | B2* | 9/2012 | Takenaka | B62D 6/003 701/72 |
| 8,775,006 | B2* | 7/2014 | Moshchuk | B62D 15/0265 701/25 |
| 8,903,607 | B2* | 12/2014 | Lee | B62D 15/0255 180/408 |
| 9,037,353 | B2* | 5/2015 | Di Cairano | B62D 6/008 701/41 |
| 9,573,623 | B2* | 2/2017 | Moshchuk | B62D 6/002 |
| 10,937,107 | B2* | 3/2021 | Shalev-Shwartz | B62D 15/0265 |
| 10,970,790 | B2* | 4/2021 | Shalev-Shwartz | B62D 15/0265 |
| 11,052,757 | B2* | 7/2021 | Kasaiezadeh Mahabadi | B60K 1/02 |
| 11,097,743 | B2* | 8/2021 | Kasaiezadeh Mahabadi | B60W 30/045 |
| 11,164,264 | B2* | 11/2021 | Shalev-Shwartz | B62D 15/025 |
| 11,332,152 | B2* | 5/2022 | Moshchuk | B60W 40/11 |
| 11,416,943 | B2* | 8/2022 | Shalev-Shwartz | B60W 30/095 |
| 11,459,029 | B2* | 10/2022 | Ishihara | B62D 5/006 |
| 11,491,970 | B2* | 11/2022 | Nahidi | B60K 17/354 |
| 2003/0042790 | A1 | 3/2003 | Amberkar | B62D 7/159 303/140 |
| 2004/0002795 | A1* | 1/2004 | Tanimoto | B60T 8/172 701/72 |
| 2004/0007412 | A1* | 1/2004 | Neef | G05B 17/02 180/402 |
| 2004/0158375 | A1* | 8/2004 | Tsutsumi | B62D 7/159 180/443 |
| 2004/0193345 | A1* | 9/2004 | Chen | B62D 6/003 180/443 |
| 2006/0061464 | A1* | 3/2006 | Okada | B60G 17/0165 340/459 |
| 2006/0091727 | A1* | 5/2006 | Motoyama | B60K 31/0066 303/189 |
| 2007/0256484 | A1* | 11/2007 | Imanishi | G01M 17/022 73/146 |
| 2008/0059021 | A1* | 3/2008 | Lu | B60G 17/0195 701/36 |
| 2008/0059034 | A1* | 3/2008 | Lu | B60W 40/101 701/41 |
| 2008/0082246 | A1* | 4/2008 | Brown | B60W 50/035 701/91 |
| 2008/0086248 | A1* | 4/2008 | Lu | B60T 8/17552 701/41 |
| 2008/0086251 | A1* | 4/2008 | Lu | B60T 8/1755 701/70 |
| 2008/0100332 | A1* | 5/2008 | Tracht | G01R 31/52 324/765.01 |
| 2009/0024269 | A1* | 1/2009 | Shorten | G01M 1/122 701/31.4 |
| 2009/0024293 | A1* | 1/2009 | Takenaka | B62D 6/002 701/71 |
| 2010/0211261 | A1* | 8/2010 | Sasaki | B60G 17/016 701/37 |
| 2012/0173039 | A1* | 7/2012 | Yokota | B60W 40/11 701/1 |
| 2012/0253608 | A1* | 10/2012 | Aoki | B62D 17/00 701/49 |
| 2013/0179036 | A1* | 7/2013 | Lee | B62D 15/0255 701/41 |
| 2013/0218396 | A1* | 8/2013 | Moshchuk | B60W 50/08 701/25 |
| 2014/0350818 | A1* | 11/2014 | Obermuller | B60T 8/172 701/74 |
| 2014/0371992 | A1* | 12/2014 | Di Cairano | B62D 5/0463 701/41 |
| 2015/0298694 | A1* | 10/2015 | Park | B60W 10/18 701/41 |
| 2016/0200360 | A1* | 7/2016 | Moshchuk | B62D 6/002 701/41 |
| 2018/0265055 | A1* | 9/2018 | Hasegawa | B60T 8/171 |
| 2018/0356819 | A1* | 12/2018 | Mahabadi | B60W 30/08 |
| 2019/0235499 | A1* | 8/2019 | Kazemi | G01S 17/931 |
| 2019/0283746 | A1* | 9/2019 | Shalev-Shwartz | G05D 1/0221 |
| 2019/0291728 | A1* | 9/2019 | Shalev-Shwartz | B60T 7/18 |
| 2019/0295179 | A1* | 9/2019 | Shalev-Shwartz | G07C 5/02 |
| 2019/0329768 | A1* | 10/2019 | Shalev-Shwartz | G06V 20/56 |
| 2020/0062069 | A1* | 2/2020 | Sorniotti | B60G 17/0162 |
| 2020/0216085 | A1* | 7/2020 | Bobier-Tiu | B60W 40/08 |
| 2020/0317048 | A1* | 10/2020 | Kasaiezadeh Mahabadi | B60K 1/02 |
| 2021/0094577 | A1* | 4/2021 | Shalev-Shwartz | B60W 30/0953 |
| 2021/0110483 | A1* | 4/2021 | Shalev-Shwartz | G01C 21/3602 |
| 2021/0110484 | A1* | 4/2021 | Shalev-Shwartz | B60W 10/18 |
| 2021/0221386 | A1* | 7/2021 | Quirynen | G05D 1/0217 |
| 2021/0245732 | A1* | 8/2021 | Nahidi | B60W 10/08 |
| 2021/0291801 | A1* | 9/2021 | Westerhof | B60W 10/08 |
| 2022/0258723 | A1* | 8/2022 | Hu | B60W 30/19 |
| 2022/0289288 | A1* | 9/2022 | Hultén | B62D 5/0484 |
| 2023/0042818 | A1* | 2/2023 | Moshchuk | B60W 60/001 |
| 2023/0044869 | A1* | 2/2023 | Asadi | B62D 7/142 |
| 2023/0082309 | A1* | 3/2023 | Boutron | B60T 8/172 |
| 2023/0084461 | A1* | 3/2023 | Koehler | B60W 60/001 |

FOREIGN PATENT DOCUMENTS

| | | | | |
|---|---|---|---|---|
| CN | 110228462 | A * | 9/2019 | B60L 15/20 |
| CN | 109204317 | B * | 5/2020 | B60W 40/10 |
| CN | 109849899 | B * | 1/2021 | |
| CN | 111497826 | B * | 8/2021 | B60W 30/02 |
| CN | 113753080 | A * | 12/2021 | |
| CN | 114889446 | A * | 8/2022 | |
| DE | 3816486 | A1 * | 12/1988 | |
| DE | 3905811 | A1 * | 9/1989 | |
| DE | 3929994 | A1 * | 3/1990 | |
| DE | 3932361 | A1 * | 4/1990 | |
| DE | 10016343 | A1 * | 10/2000 | B60T 8/1755 |
| DE | 10015682 | A1 * | 2/2001 | B62D 7/159 |
| DE | 10015682 | B4 * | 2/2007 | B62D 7/159 |
| EP | 0278366 | A1 * | 8/1988 | |
| EP | 0473112 | A2 * | 3/1992 | |
| EP | 0476372 | A1 * | 3/1992 | |
| FR | 3111617 | A1 * | 12/2021 | |
| JP | 2520144 | B2 * | 7/1996 | |
| JP | 2623940 | B2 * | 6/1997 | |
| JP | H107010 | A * | 1/1998 | |
| JP | 2000289637 | A * | 10/2000 | B62D 7/159 |
| JP | 3546423 | B2 * | 7/2004 | B60T 8/1755 |
| JP | 2014159269 | A * | 9/2014 | B62D 6/002 |
| WO | WO-2022113249 | A1 * | 6/2022 | |

OTHER PUBLICATIONS

"Investigating Functional Redundancies in the Context of Vehicle Automation—A Trajectory Tracking Perspective;" Stolt et al.; ARXIV ID: 1805.02028; May 5, 2018. (Year: 2018).*

"A model predictive control allocation approach to hybrid braking of electric vehicles;" Satzger et al. ; 2014 IEEE Intelligent Vehicles Symposium Proceedings (pp. 286-292); Aug. 1, 2014. (Year: 2014).*

"Integrated control of in-wheel-motored electric vehicles using a model predictive control method;" Ren et al.; Proceeding of the 11th World Congress on Intelligent Control and Automation (pp. 1676-1681); Jun. 1, 2014. (Year: 2014).*

* cited by examiner

VEHICLE ACTUATION COMMANDS TO AFFECT TRANSIENT HANDLING

INTRODUCTION

The subject disclosure relates to vehicle actuation commands to affect transient handling.

Vehicles (e.g., automobiles, trucks, motorcycles) can generally be thought of as being in steady state or transient motion. Unlike in steady state, during transient motion, one or more variables (e.g., lateral acceleration) are changing. Vehicles are increasingly available in both a traditional gas-only version and a battery version (e.g., hybrid vehicle, electrified vehicle). The battery version of a vehicle is heavier than the gas-only version. As a result, the transient response, which is subjectively perceived by a driver as the handling of the vehicle, may be sluggish. Accordingly, it is desirable to provide vehicle actuation commands to affect transient handling.

SUMMARY

In one exemplary embodiment, a method of controlling a vehicle includes obtaining a linear representation of a vehicle dynamics model that include actuator dynamics u integrated with vehicle dynamics x. The actuator dynamics u include a road wheel angle at rear wheels δr and a torque Mz. The method also includes obtaining an objective function based on a function of the vehicle dynamics x and the actuator dynamics u and formulates a cost function to minimize the objective function. The actuator dynamics u including the torque Mz are determined for a next time sample based on minimizing the objective function. The vehicle is controlled to implement the torque Mz.

In addition to one or more of the features described herein, the determining the actuator dynamics u including the torque Mz includes obtaining the road wheel angle at the rear wheels δr as an input.

In addition to one or more of the features described herein, the determining the actuator dynamics u including the torque Mz includes also determining the road wheel angle at the rear wheels δr.

In addition to one or more of the features described herein, the method also includes formulating a constraint to be solved with minimization of the cost function, wherein the constraint minimizes the actuator dynamics u.

In addition to one or more of the features described herein, the method also includes representing the cost function and the constraint as:

$$J(x_t, u_t) = \frac{1}{2}\int\left[(u_t - u_{tref})^T R_t(u_t - u_{tref})\right]dt + \frac{1}{2}\int\left[(y_t - y_{tdes})^T Q_t(y_t - y_{tdes})\right]dt,$$

where $R_t$ and $Q_t$ are weights, $u_{tref}$ is a reference provided by a supervisory algorithm, and $y_t - y_{tdes}$ is the objective function with $y_t$ being a vector that is the function of the vehicle dynamics x and the actuator dynamics u and $y_{tdes}$ being a vector of desired values.

In addition to one or more of the features described herein, the vehicle dynamics x include lateral velocity Vy and yaw rate r.

In addition to one or more of the features described herein, the formulating the cost function is as a quadratic programming problem.

In addition to one or more of the features described herein, the determining the actuator dynamics u for the next time sample includes using a linear quadratic regulator as a solver for the quadratic programming problem.

In addition to one or more of the features described herein, the determining the actuator dynamics u includes using a feedforward and feedback algorithm.

In another exemplary embodiment, a system in a vehicle includes memory configured to store parameters, and processing circuitry to obtain a linear representation of a vehicle dynamics model that includes actuator dynamics u integrated with vehicle dynamics x. The actuator dynamics u include a road wheel angle at rear wheels δr and a torque Mz. The processing circuitry also obtains an objective function based on a function of the vehicle dynamics x and the actuator dynamics u and formulates a cost function to minimize the objective function. The actuator dynamics u including the torque Mz are determined for a next time sample based on minimizing the objective function. The vehicle is controlled to implement the torque Mz.

In addition to one or more of the features described herein, the processing circuitry determining the actuator dynamics u including the torque Mz includes the processing circuitry obtaining the road wheel angle at the rear wheels r as an input.

In addition to one or more of the features described herein, the processing circuitry determining the actuator dynamics u including the torque Mz includes the processing circuitry also determining the road wheel angle at the rear wheels δr.

In addition to one or more of the features described herein, the processing circuitry formulates a constraint to be solved with minimization of the cost function, wherein the constraint minimizes the actuator dynamics u.

In addition to one or more of the features described herein, the processing circuitry represents the cost function and the constraint as:

$$J(x_t, u_t) = \frac{1}{2}\int\left[(u_t - u_{tref})^T R_t(u_t - u_{tref})\right]dt + \frac{1}{2}\int\left[(y_t - y_{tdes})^T Q_t(y_t - y_{tdes})\right]dt,$$

where $R_t$ and $Q_t$ are weights, $u_{tref}$ is a reference provided by a supervisory algorithm, and $y_t - y_{tdes}$ is the objective function with $y_t$ being a vector that is the function of the vehicle dynamics x and the actuator dynamics u and $y_{tdes}$ being a vector of desired values.

In addition to one or more of the features described herein, the vehicle dynamics x include lateral velocity Vy and yaw rate r.

In addition to one or more of the features described herein, the processing circuitry formulates the cost function as a quadratic programming problem.

In addition to one or more of the features described herein, the processing circuitry determining the actuator dynamics u for the next time sample includes the processing circuitry using a linear quadratic regulator as a solver for the quadratic programming problem.

In addition to one or more of the features described herein, the processing circuitry determining the actuator dynamics u includes using a feedforward and feedback algorithm.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
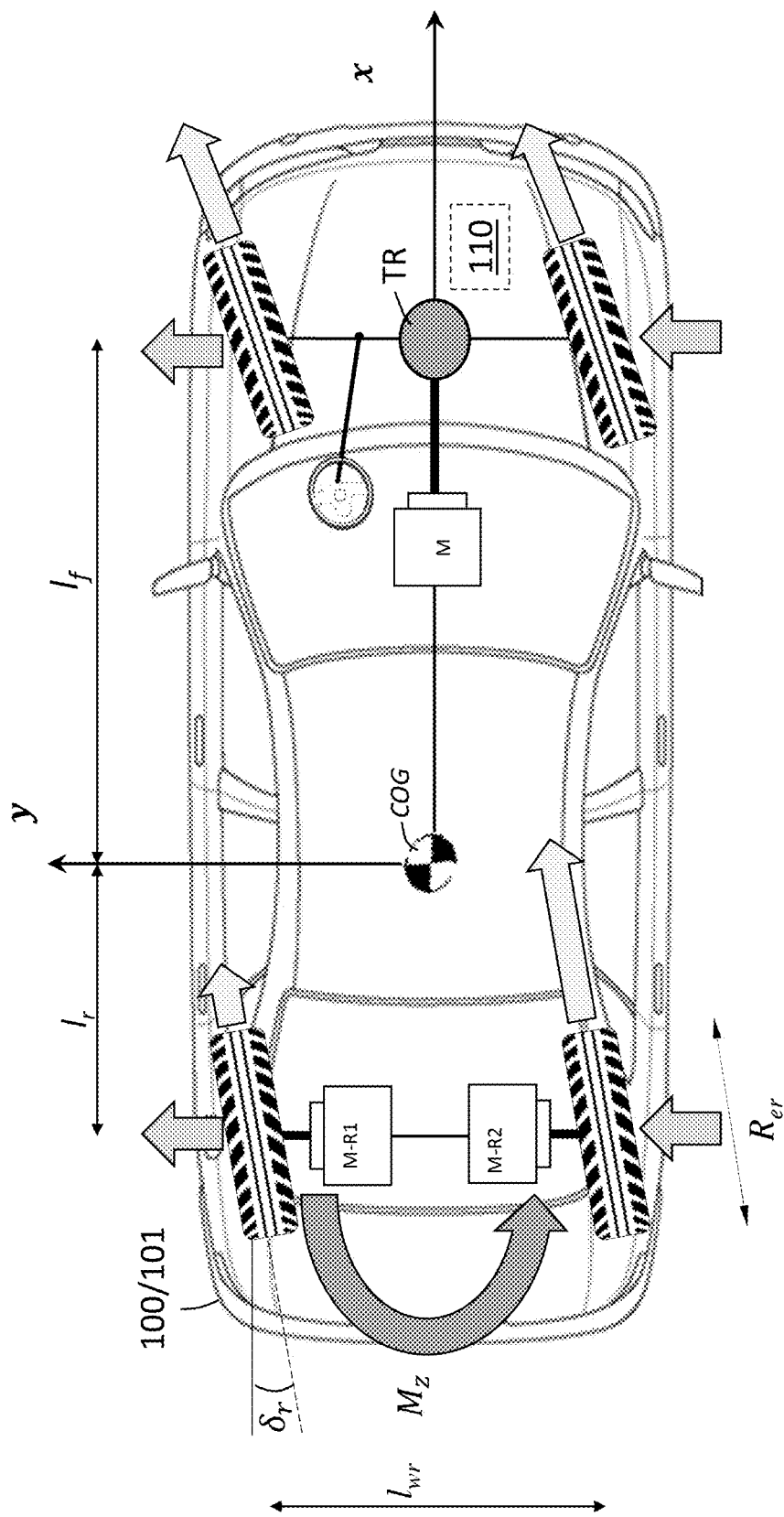
FIG. 1 is a block diagram of a vehicle that determines vehicle actuation commands to affect transient handling according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a driver of a heavier version of a given vehicle (e.g., battery hybrid as compared with gas-only version) may experience a relatively sluggish response. One manifestation of the sluggishness of the heavier version of the vehicle is a longer time between a torque input (e.g., driver depressing the accelerator pedal) and achieving the torque command. However, simply making the response time faster may lead to instability.

Embodiments of the systems and methods detailed herein relate to vehicle actuation commands to affect transient handling. Existing torque vectoring and active rear steering (ARS) mechanisms may be the vehicle actuation mechanisms for which commands are determined to improve the agility of a vehicle. Specifically, a cost function may be developed to formulate routine agility (RA) and routine stability (RS) metrics in terms of vehicle states. Minimizing the cost function results in a faster response balanced with a feeling of stability. Minimization of the cost function is used to determine the commands for the torque vectoring and, when available, ARS mechanisms.

In accordance with an exemplary embodiment, FIG. 1 is a block diagram of a vehicle 100 that determines vehicle actuation commands to affect transient handling. The exemplary vehicle 100 shown in FIG. 1 is an automobile 101. The center of gravity (COG) and x and y coordinates associated with vehicle motion are indicated. Also indicated are the effective radius of the rear tire $R_{er}$, the distance between the wheel centers of the two rear wheels $l_{wr}$, the distance between the COG and front axle $l_f$, and the distance between the COG and the rear axle $l_r$. A motor M that provides drive power to a transmission TR to drive the front wheels and rear motors M-R1 and M-R2 that drive the rear wheels are shown. Torque Mz generated by the torque vectoring actuators and the road wheel angle at the rear wheels δr generated by the ARS mechanism are indicated. These may be commands that are determined according to one or more embodiments to affect the transient handling of the vehicle 100. According to alternate embodiments, the road wheel angle at the rear wheels δr may also be an input used to determine the torque Mz.

A controller 110 is indicated in the vehicle 100. This controller 110 may be a collection of systems that together control different aspects of vehicle dynamics and operation. For example, the controller 110 may control the rear motors M-R1 and M-R2 that achieve the torque Mz that is determined according to the processes discussed with reference to FIG. 2. The controller 110 may also control the ARS functionality to set the road wheel angle at the rear wheels δr. The controller 110 may perform the processes and computations described in order to ultimately generate commands for one or more vehicle actuation mechanisms (e.g., torque vectoring actuator, ARS mechanisms) to improve vehicle handling. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory may store vehicle parameters (e.g., effective radius of the rear tire $R_{er}$) used in subsequent processes.

Figure 2:
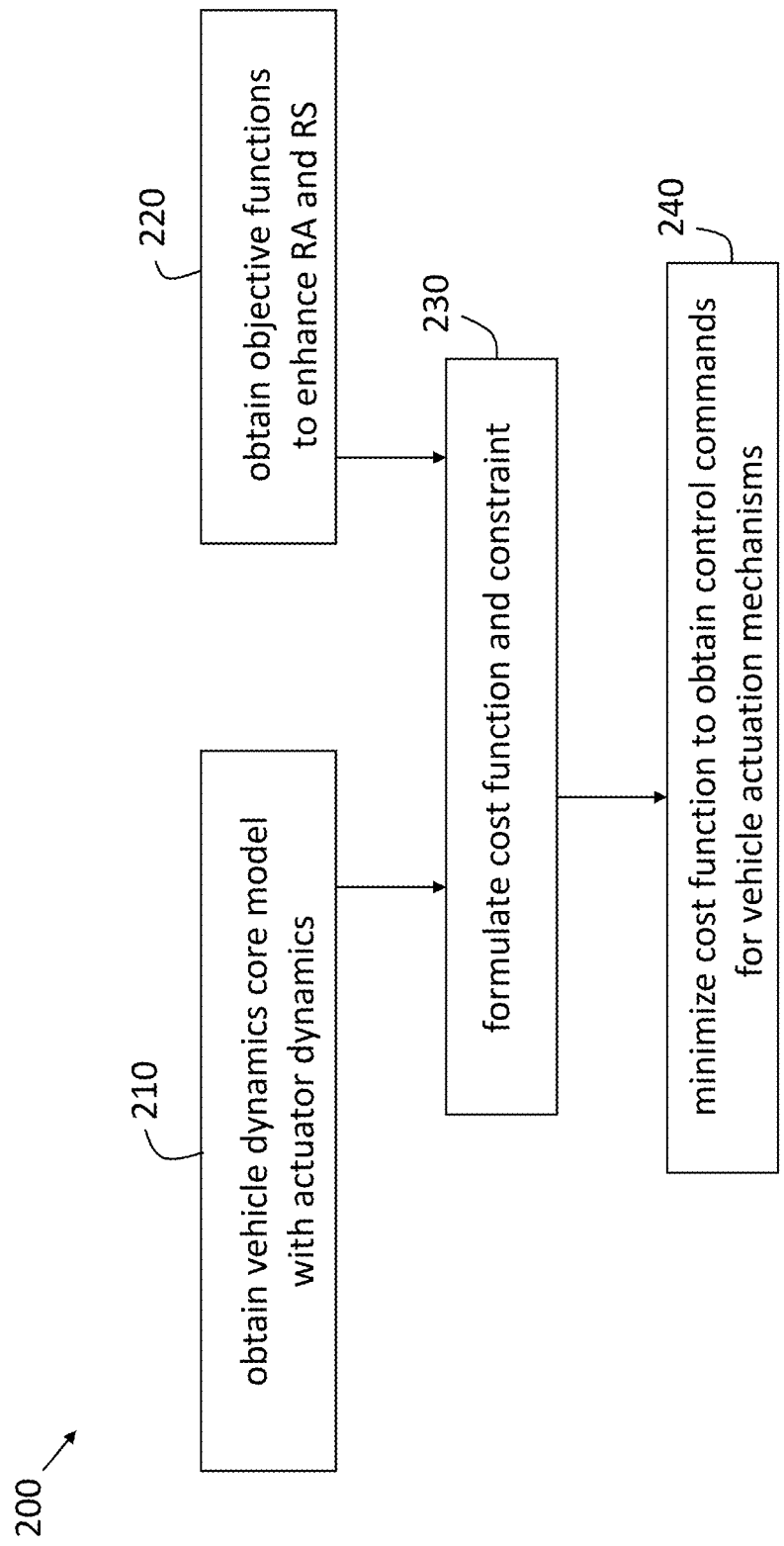
FIG. 2 is a process flow of a method of determining vehicle actuation commands to affect transient handling according to one or more embodiments.

FIG. 2 is a process flow of a method 200 of determining vehicle actuation commands to affect transient handling according to one or more embodiments. At block 210, the processes include obtaining a vehicle dynamics core model integrated with actuator dynamics. Generally, the core model may be obtained as:

$$\dot{x}(t)=f(x(t),u(t)) \quad [EQ. 1]$$

In EQ. 1, x(t) represents the vehicle dynamics and u(t) represents the actuator dynamics. To facilitate optimization, the representation is linearized such that the processes at block 210 include obtaining a linearized representation of a vehicle dynamics model that integrates actuator dynamics:

$$x_{t+1}=Ax_t+Bu_t+C\delta_f \quad [EQ. 2]$$

EQ. 2 includes the road wheel angle at the front wheels δf. In addition:

$$A = \frac{\partial f}{\partial x} \quad [EQ. 3]$$

$$B = \frac{\partial f}{\partial u} \quad [EQ. 4]$$

$$x = \begin{bmatrix} V_y \\ r \end{bmatrix} \quad [EQ. 5]$$

$$u = \begin{bmatrix} \delta_r \\ M_z \end{bmatrix} \quad [EQ. 6]$$

In EQ. 5, Vy is the lateral velocity and δr is the yaw rate. These indicate the current vehicle state. The road wheel angle at the rear wheels δr and the torque Mz, which are the actuator commands represented by u, as indicated at EQ. 6, are optimized as further discussed. While determination of both the road wheel angle at the rear wheels δr and the torque Mz is discussed herein for explanatory purposes, the road wheel angle at the rear wheels δr may be an input, as previously noted. In that case, only the torque Mz is the only one of the actuation commands u determined according to the processes discussed with reference to FIGS. 2 and 3.

At block 220, obtaining an objective function to enhance RA and RS refers to obtaining the function to be minimized. The objective function is a function of x and u (y(x, u)) and is given by $y_t - y_{tdes}$, where $y_t$ designates the predicted objective value and $y_{tdes}$ designates the desired objective value. At block 230, formulating the cost function and constraint results in the following:

$$J(x_t, u_t) = \quad [EQ. 7]$$
$$\frac{1}{2}\int\left[(u_t - u_{tref})^T R_t (u_t - u_{tref})\right]dt + \frac{1}{2}\int\left[(y_t - y_{tdes})^T Q_t (y_t - y_{tdes})\right]dt$$

The second part of EQ. 7, involving the objective function, can be regarded as the cost function portion (i.e., transient handling error), while the optional first part of EQ. 7 can be regarded as the constraint portion (i.e., control action error). The weights $R_t$ and $Q_t$ facilitate control of how much each of the portions affects J. The optional first part of EQ. 7 limits the value of $u_t$ based on a reference $u_{tref}$ that may be provided by a supervisory algorithm or system that supervises the transient handling. The supervisory algorithm may be implemented by the controller 110 like other aspects of the transient handling. Alternately, $u_{tref}$ may be 0.

In addition to the constraint based on the reference $u_{tref}$, the actuator dynamics $u_t$ are also subject to the following constraints:

$$u_{min} \leq u_t \leq u_{max} \quad [EQ. 8]$$

$$\Delta u_{min} \leq \Delta u_t \leq \Delta u_{max} \quad [EQ. 9]$$

And, the predicted objective value $y_t$ is subject to the following constraint:

$$y_{min} \leq y_t \leq y_{max} \quad [EQ. 10]$$

Each of the min and max values are calibration values that may be fixed or whose selection from tables may be updated based on actuator capacities, road condition, or vehicle status (e.g., yaw rate).

Table 1 details four components of $y_t$ and $y_{tdes}$. That is, the objective function $y_t$-$y_{tdes}$ is a 1-by-4 matrix. Based on the transpose, indicated by T, each part of EQ. 7 results in a single value.

TABLE 1

Objective function values.

| | |
|---|---|
| $y_1 = l_f F_{yfl}^{CG} + l_f F_{yfr}^{CG} - l_r F_{yrl}^{CG} - l_r F_{yrr}^{CG}$ | $y_{1des} = 0$ |
| $y_2 = r$ | $y_{2des} = r_{ss} = \delta_f \dfrac{V_x}{l_f + l_r}$ |
| $y_3 = A_y = \dot{V}_y + rV_x$ | $y_{3des} = A_{yss} = \delta_f \dfrac{V_x^2}{l_f + l_r}$ |
| $y_4 = A_{yf} = \dot{V}_y + rV_x + \dot{r}l_f$ | $y_{4des} = A_{yfss} = \delta_f \dfrac{V_x^2}{l_f + l_r}$ |

In Table 1, $F_{yij}^{CG}$ indicates lateral force at each tire in vehicle body coordinates with i indicating front for rear δr and j indicating left l or right r. In addition, $r_{ss}$ indicates steady state yaw rate which is based on longitudinal velocity Vx. Ay is the lateral acceleration and Ayss is steady state lateral acceleration. $A_{yf}$ is lateral acceleration at the front axle and $A_{yfss}$ is the steady state lateral acceleration at the front axle. Finally, $\dot{V}_y$ and $\dot{r}$ are given by:

$$\dot{V}_y = \frac{\left(F_{yfl}^{CG} + F_{yfr}^{CG} + F_{yrl}^{CG} + F_{yrr}^{CG}\right)}{m - rV_x} \quad [EQ. 11]$$

-continued
$$\dot{r} = \frac{\left(l_f\left(F_{yfl}^{CG} + F_{yfr}^{CG}\right) - l_r\left(F_{yrl}^{CG} + F_{yrr}^{CG}\right) + M_z\right)}{I_{ZZ}} \quad [EQ. 12]$$

In EQ. 11, m is mass, and in EQ. 12, $I_{zz}$ is moment of inertia around the z axis, which is perpendicular to the x and y axes indicated in FIG. 1.

At block 240, the processes include minimizing the cost function to obtain control commands for vehicle actuation mechanisms. Any known procedure may be used to optimize the cost function to determine the actuator commands represented by u, as indicated at EQ. 6. That is:

$$u_t(x_t) \triangleq \mathrm{argmin}_u j(x_t, y_t) \quad [EQ. 13]$$

The optimal solution $u_t$ for the current state $x_t$ may indicate the road wheel angle at the rear wheels δr and the torque Mz needed to execute the transient state of the vehicle 100 with agility. Once the actuation commands (e.g., δr, Mz) are obtained according to one or more embodiments, using the ARS functionality to achieve the road wheel angle at the rear wheels δr and controlling the motors M-R1 and M-R2 to achieve the torque Mz are known mechanisms. That is, when two rear motors M-R1 and M-R2 are present, as in the exemplary case, the rear motors M-R1 and M-R2 may be used to achieve torque Mz. For example, the torque Mz is given by:

$$M_z = \frac{l_{wr}}{2R_{er}}(T_{R1} - T_{R2})\cos\delta_r \quad [EQ. 14]$$

In EQ. 14, $T_{R1}$ and $T_{R2}$ are the torques produced by the motors M-R1 and M-R2, respectively. Based on determining the torque Mz, the motors M-R1 and M-R2 may then be controlled to produce the necessary $T_{R1}$ and $T_{R2}$. According to alternate embodiments, other known mechanisms may be used to achieve the torque Mz, once it is determined according to one or more embodiments. An exemplary method 300 to obtain the optimal solution $u_t$ for the current state $x_t$ involves a quadratic programming (QP) solver, which is discussed with reference to FIG. 3.

Figure 3:
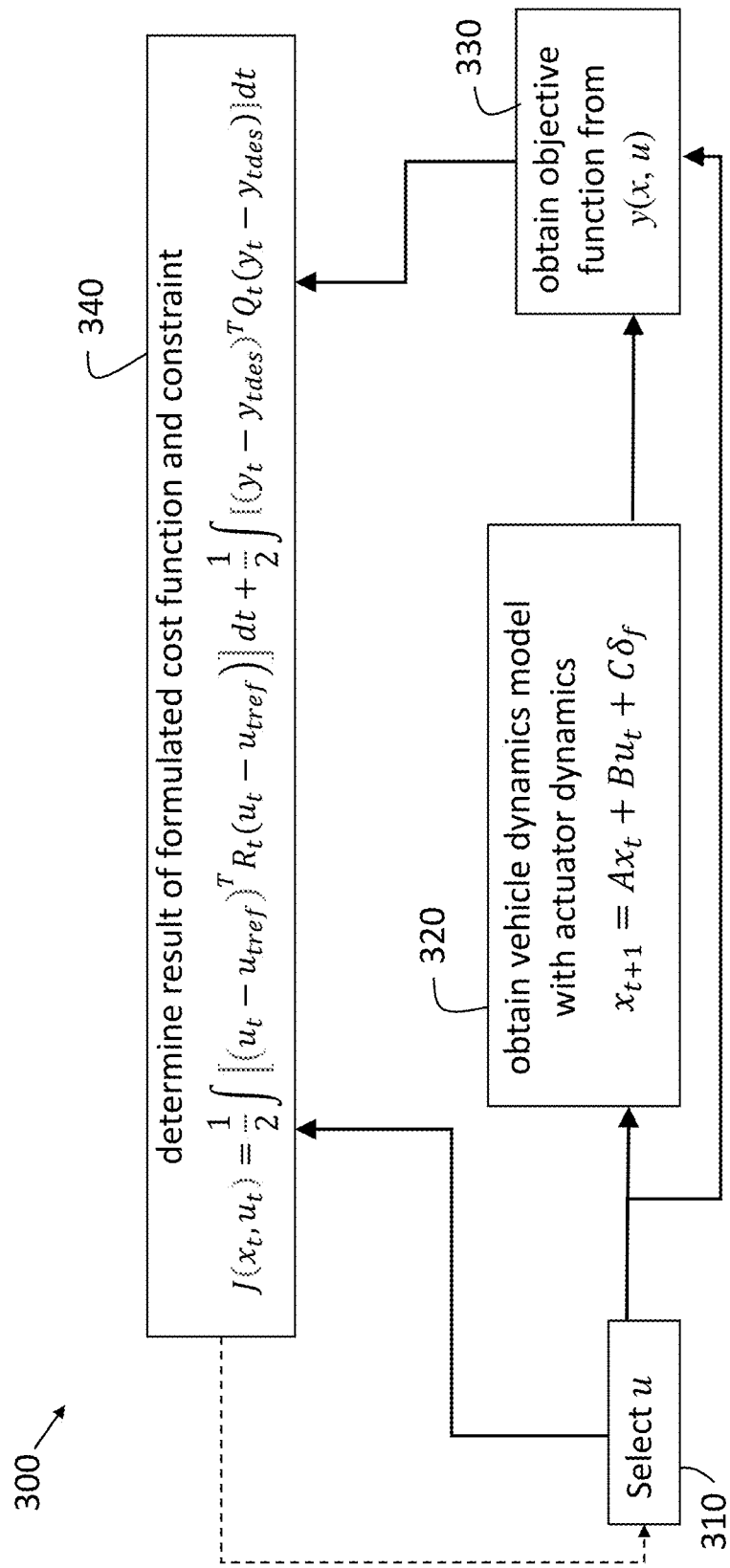
FIG. 3 is a process flow of a method of optimizing the cost function formulated in the flow of FIG. 2 according to an exemplary embodiment.

FIG. 3 is a process flow of a method 300 of optimizing the cost function formulated at block 230 using a QP solver according to an exemplary embodiment. FIG. 3 shows the relationship between determining u, which defines the road wheel angle at the rear wheels δr and the torque Mz, and optimizing the formulated cost function and constraint according to the QP solver. At block 310, selecting u refers to selecting a road wheel angle at the rear wheels δr and a torque Mz that make up u, according to EQ. 6. As previously noted, in exemplary embodiments, the road wheel angle at the rear wheels δr may be provided as an input rather than determined. The selection of u may be according to any known approach. For example, a linear quadratic regulator (LQR) may be employed to calculate u. Implementation of the LQR technique includes implementation of a Hamiltonian function, optimality equation, and costate equations, which assume both feedback and feedforward elements (i.e., a feedforward and feedback algorithm). The feedforward of actuation dynamics u and feedback to determine actuation dynamics u are illustrated in FIG. 3.

At block 320, obtaining a vehicle dynamics model with actuator dynamics integrated refers to obtaining the linearized representation set out as EQ. 2. With u selected, EQ. 2 may be solved for the current time sample t. The selected u (at block 310) is also provided to blocks 330 and 340. At block 330, the objective function based on y(x, u) may be determined according to the selection of u at block 310. The selected u (from block 310) and the objective function (from block 330) are provided to determine the result of the formulated cost function and constraint at block 340. As indicated in FIG. 3, another iteration at the next sample time may be initiated by selecting a different u at block 310. The processes may be repeated until the change in the result, J, from the previous iteration is below a threshold value, for example.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling a vehicle to affect torque vectoring and active rear steering during a transient motion of the vehicle, the method comprising:
   obtaining a linear representation of a vehicle dynamics model that include actuator dynamics u integrated with vehicle dynamics x, the actuator dynamics u including a road wheel angle at rear wheels δr and a torque Mz;
   obtaining an objective function based on a function of the vehicle dynamics x and the actuator dynamics u;
   formulating a cost function to minimize the objective function;
   determining the actuator dynamics u including the torque Mz for a next time sample based on minimizing the objective function;
   controlling at least two motors to implement the torque Mz, thereby affecting torque vectoring and active rear steering during a transient motion of the vehicle.

2. The method according to claim 1, wherein the determining the actuator dynamics u including the torque Mz includes obtaining the road wheel angle at the rear wheels δr as an input.

3. The method according to claim 1, wherein the determining the actuator dynamics u including the torque Mz includes also determining the road wheel angle at the rear wheels δr.

4. The method according to claim 1, further comprising formulating a constraint to be solved with minimization of the cost function, wherein the constraint minimizes the actuator dynamics u.

5. The method according to claim 4, further comprising representing the cost function and the constraint as:

$$J(x_t, u_t) = \frac{1}{2}\int [(u_t - u_{tref})^T R_t (u_t - u_{tref})]dt + \frac{1}{2}\int [(y_t - y_{tdes})^T Q_t (y_t - y_{tdes})]dt,$$

where
   $R_t$ and $Q_t$ are weights, $u_{tref}$ is a reference provided by a supervisory algorithm, and $y_t - y_{tdes}$ is the objective function with $y_t$ being a vector that is the function of the vehicle dynamics x and the actuator dynamics u and $y_{tdes}$ being a vector of desired values.

6. The method according to claim 1, wherein the vehicle dynamics x include lateral velocity Vy and yaw rate r.

7. The method according to claim 1, wherein the formulating the cost function is as a quadratic programming problem.

8. The method according to claim 7, wherein the determining the actuator dynamics u for the next time sample includes using a linear quadratic regulator as a solver for the quadratic programming problem.

9. The method according to claim 8, wherein the determining the actuator dynamics u includes using a feedforward and feedback algorithm.

10. A system in a vehicle, the system comprising:
    memory configured to store parameters; and
    processing circuitry configured to obtain a linear representation of a vehicle dynamics model that includes actuator dynamics u integrated with vehicle dynamics x, the actuator dynamics u including a road wheel angle at rear wheels δr and a torque Mz, to obtain an objective function based on a function of the vehicle dynamics x and the actuator dynamics u, to formulate a cost function to minimize the objective function, and to determine the actuator dynamics u including the torque Mz for a next time sample based on minimizing the objective function, wherein the processing circuitry is configured to control at least two motors to implement the torque Mz, thereby affecting torque vectoring and active rear steering during a transient motion of the vehicle.

11. The system according to claim 10, wherein the processing circuitry determining the actuator dynamics u including the torque Mz includes the processing circuitry obtaining the road wheel angle at the rear wheels or as an input.

12. The system according to claim 10, wherein the processing circuitry determining the actuator dynamics u including the torque Mz includes the processing circuitry also determining the road wheel angle at the rear wheels δr.

13. The system according to claim 10, wherein the processing circuitry is also configured to formulate a constraint to be solved with minimization of the cost function, wherein the constraint minimizes the actuator dynamics u.

14. The system according to claim 13, wherein the processing circuitry is also configured to represent the cost function and the constraint as:

$$J(x_t, u_t) = \frac{1}{2}\int [(u_t - u_{tref})^T R_t (u_t - u_{tref})]dt + \frac{1}{2}\int [(y_t - y_{tdes})^T Q_t (y_t - y_{tdes})]dt,$$

where
   $R_t$ and $Q_t$ are weights, $u_{tref}$ is a reference provided by a supervisory algorithm, and $y_t - y_{tdes}$ is the objective function with $y_t$ being a vector that is the function of the vehicle dynamics x and the actuator dynamics u and $y_{tdes}$ being a vector of desired values.

15. The system according to claim 10, wherein the vehicle dynamics x include lateral velocity Vy and yaw rate r.

16. The system according to claim 10, wherein the processing circuitry formulates the cost function as a quadratic programming problem.

17. The system according to claim 16, wherein the processing circuitry determining the actuator dynamics u for the next time sample includes the processing circuitry using a linear quadratic regulator as a solver for the quadratic programming problem.

18. The system according to claim 17, wherein the processing circuitry determining the actuator dynamics u$_5$ includes using a feedforward and feedback algorithm.

\* \* \* \* \*